United States Patent [19]
Lee et al.

[11] Patent Number: 5,558,316
[45] Date of Patent: Sep. 24, 1996

[54] HYDRO-MOUNT FOR POWER PLANT

[75] Inventors: Hyosang Lee, Kyungsangnam-do; Youngkun Yoon, Kyungsangbuk-do, both of Rep. of Korea

[73] Assignee: Hyundai Motor Company, Rep. of Korea

[21] Appl. No.: 538,205

[22] Filed: Oct. 3, 1995

[30] Foreign Application Priority Data

Oct. 4, 1994 [KR] Rep. of Korea .................... 94-25304

[51] Int. Cl.$^6$ ........................................ F16M 5/00
[52] U.S. Cl. ........................ 267/140.12; 267/219
[58] Field of Search .............. 267/140.12, 140.11, 267/140.13, 219, 220; 180/300, 312; 248/562, 636

[56] References Cited

U.S. PATENT DOCUMENTS 5,429,343 7/1995 Maeno et al. .................... 267/140.12

FOREIGN PATENT DOCUMENTS

5-256335 10/1993 Japan .
6-40490 5/1994 Japan .

*Primary Examiner*—Douglas C. Butler
*Attorney, Agent, or Firm*—Finnegan, Henderson, Farabow, Garrett, & Dunner, L.L.P.

[57] ABSTRACT

Disclosed is a hydro mount for a power plant having an engine, a clutch, and a transmission all of which are integrally formed with each other. The hydro mount has an outer pipe, a frame member inserted into the outer pipe, an elastic member supportably inserted in the frame member, orifice disposed around the frame to communicate a main chamber and a sub-chamber with each other, and an inner pipe inserted and attached by vulcanization to the elastic member. The frame member includes a pair of ring-shape rim members arranged along a central axis, and first, second and third connecting members connecting the rim members with each other at a predetermined interval, the first and second being disposed to opposite each other on a plane where the central axis is laid and the third connecting member being disposed at 90° with respect to each first and second connecting member. The elastic member includes a boss having a penetrating hole, a pair of circular-shape side plates attached respectively on opposite ends of the boss, and first, second, and third projections extending in a radial direction from an outer surface of the boss and contacting respectively the first, second and third connecting members of the frame member to define a main chamber and a sub chamber with the outer pipe and the pair of plates.

8 Claims, 14 Drawing Sheets

HYDRO-MOUNT FOR POWER PLANT

BACKGROUND OF THE INVENTION

1. Field of the Invention

The present invention relates to a hydro-mount for a power plant having an engine, a clutch and a transmission all of which are integrally formed with each other.

2. Description of Related Art

Generally, a hydro-mount for a power plant insulates power plant from the vehicle body and consequently reduces the noise and vibration transmitted to the passenger compartment to thereby improve ride comfort.

Figure 8:
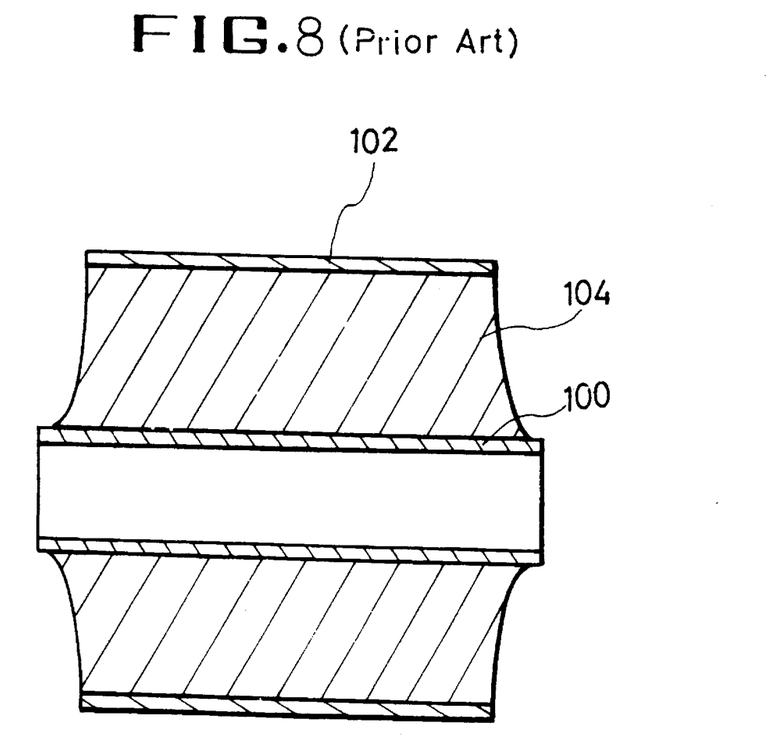
FIG. 8 is a sectional view of a conventional mount.

As shown in FIG. 8, a conventional mount for a power plant is designed such that the vibration can be absorbed by an elastic rubber 104 which is fused between inner and outer pipes 100 and 102.

However, since this mount uses only absorbing value of the elastic rubber, sufficient absorbing effect cannot be obtained.

Accordingly, to increase absorbing rate of the vibration and noise which is generated by the power plant consisting of an engine, a clutch and a transmission, it is required to increase the amount of the elastic rubber. In this case, static and dynamic spring rates are however to be increased only to lower the absorbing rate of the vibration and noise.

To solve the above described problems of the conventional mount, Japanese laid-open patent No. P5- 256335 and Japanese laid-open utility model No. P6-40490 disclose a hydro-mount for an engine which is filled with fluid.

The hydro-mount has an elastic member provided with fluid chamber on its upper and lower portions. An orifice is provided between the elastic member and the outer pipe such that the fluid flows between the fluid chambers in accordance with the movement of the inner pipe.

Further, the former is provided with a special diaphragm formed inside of the outer pipe and the latter is provided with a special compressed rubber inserted between the elastic member and an elastic hole so that vibration can be more effectively absorbed. These are for simply increasing the amount of the flowing fluid when the vibration is introduced such that there is a limitation to actively reduce the vibration.

SUMMARY OF THE INVENTION

Accordingly, the objects of the present invention are to provide a hydro-mount for a power plant, which can provides a stable dynamic characteristic and varies the dynamic characteristic easily.

It is another object of the present invention to provide a hydro-mount which has a good durability and can be made by easy manufacturing process.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention provides a hydro mount for a power plant having an engine, a clutch, and a transmission all of which are integrally formed with each other, comprising: an outer pipe having a central axis; a frame member inserted into the outer pipe and including a pair of ring-shape rim members arranged along the central axis, and first, second and third connecting members connecting the rim members with each other at a predetermined interval, the first and second rim connecting members being disposed to opposite each other on a plan where the central axis is laid and the third connecting member being disposed at 90° with respect to each first and second connecting member; an elastic member supportably inserted in the frame member and including a boss having a penetrating hole, a pair of circular-shape side plates attached respectively on opposite ends of the boss, and first, second, and third projections extending in a radial direction from an outer surface of the boss and contacting respectively the first, second and third connecting members of the frame member to define a main chamber and a sub chamber with the outer pipe and the pair of plates; orifice means disposed around the connecting members of the frame to communicate the main chamber and the subchamber with each other; and an inner pipe inserted and attached by vulcanization to the penetrating hole of the boss of the elastic member.

In another aspect, the present invention provides the hydro-mount, wherein the orifice means includes an orifice rubber provided with a circumferential jaw formed along a circumferential edge of an outer surface thereof and a middle jaw formed along a middle way of the outer surface to thereby define first and second fluid passages, the first fluid passage being provided with an orifice hole formed on its one side, a portion of the middle jaw being cut away at a side, which is opposite to the side where the orifice hole is formed, to form a cutting portion which can communicate the first and second fluid passages with each other, and a portion of the circumferential jaw being cut away at a side, which is opposite to the side where the cutting portion is defined, to define an opening which can communicate the second fluid passage with the main chamber.

In still another aspect, the present invention provides the hydro-mount, wherein the elastic member further includes a stopper rubber extending from the boss in an opposite direction of the third projection and has a hollow portion into which a stopper extending from the inner pipe is inserted.

In a further aspect, a support is formed on top of the stopper, the support having an arcuate upper portion having a curvature diameter corresponding to an inner diameter of the outer pipe.

In a still further aspect, an elastic hole is formed through the first, second and third projections such that diaphragms are formed respectively between the first and third projections and between the second and third projections.

In a still further aspect, a plurality of circumferential projections formed from and along the outer circumferential surfaces of each side plate of the elastic member at an even interval to prevent fluid within the main and sub-chambers from leaking out.

In a still further aspect, to maintain a tight seal between the inner surface of the outer pipe and the orifice rubber member, a projection extends from and along the circumferential and middle jaws.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention.

DETAILED DESCRIPTION OF A PREFERRED EMBODIMENT

Reference will now be made in detail to the present preferred embodiment of the invention, an example of which is illustrated in the accompanying drawings. Wherever possible, the same reference numbers will be used throughout the drawings to refer to the same or like parts.

Figure 1:
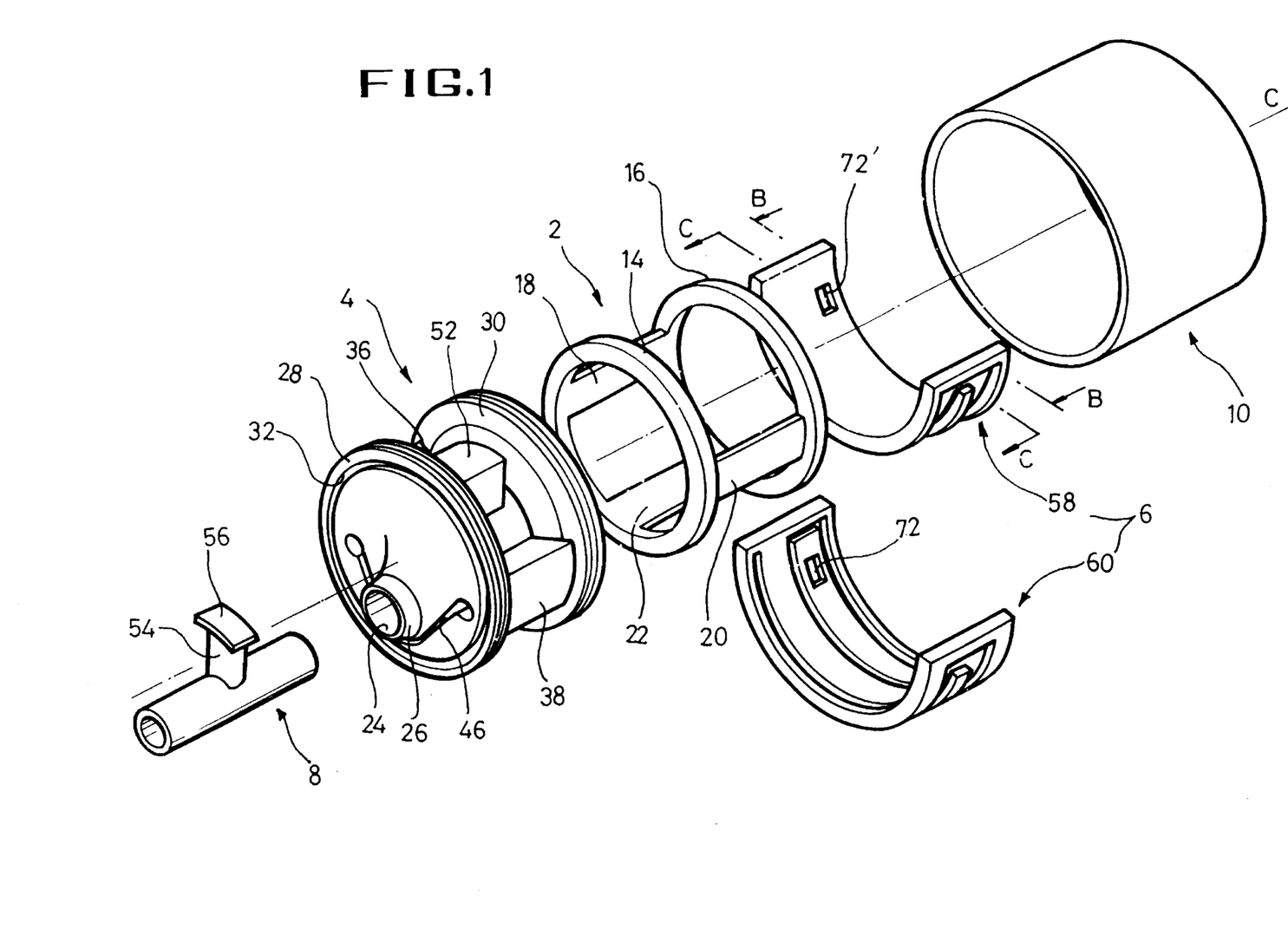
FIG. 1 is an exploded perspective view of a hydro-mount for a power plant according to a preferred embodiment of the present invention.

Referring to FIG. 1, the inventive hydro-mount for a power plant comprises a frame 2, an elastic member 4 supported by the frame 2, an orifice member 6 disposed on an outer surface of the frame 2, an inner pipe 8 located inside the elastic member 4, and an outer pipes 10 into which the frame 2 is inserted. The frame and elastic member 2 and 4 have a common central axis C with the outer tube 10.

The frame member 2 is made of a metal or a material having a certain rigidity and includes a pair of ring-shape rim members 14 and 16 arranged along the central axis, and connecting members 18, 20 and 22 connecting the rim members 14 and 16 with each other at a predetermined interval. The connecting members 18 and 20 are disposed to opposite each other on a plane where the central axis C is laid and the connecting member 22 is disposed at 90° With respect to each connecting member 18 and 20.

The elastic member 4 is supportably inserted in the frame member 2 and includes a boss 26 having a penetrate hole 24 and a pair of circular-shape side plates 28 and 30 attached respectively on opposite ends of the boss 26. The boss 26 is eccentrically disposed from the central axis C. Each circumference edge of the side plates 28 and 30 is provided with circumference grooves 32 and 34, respectively, to house each rim member 14 and 16.

Figure 2:
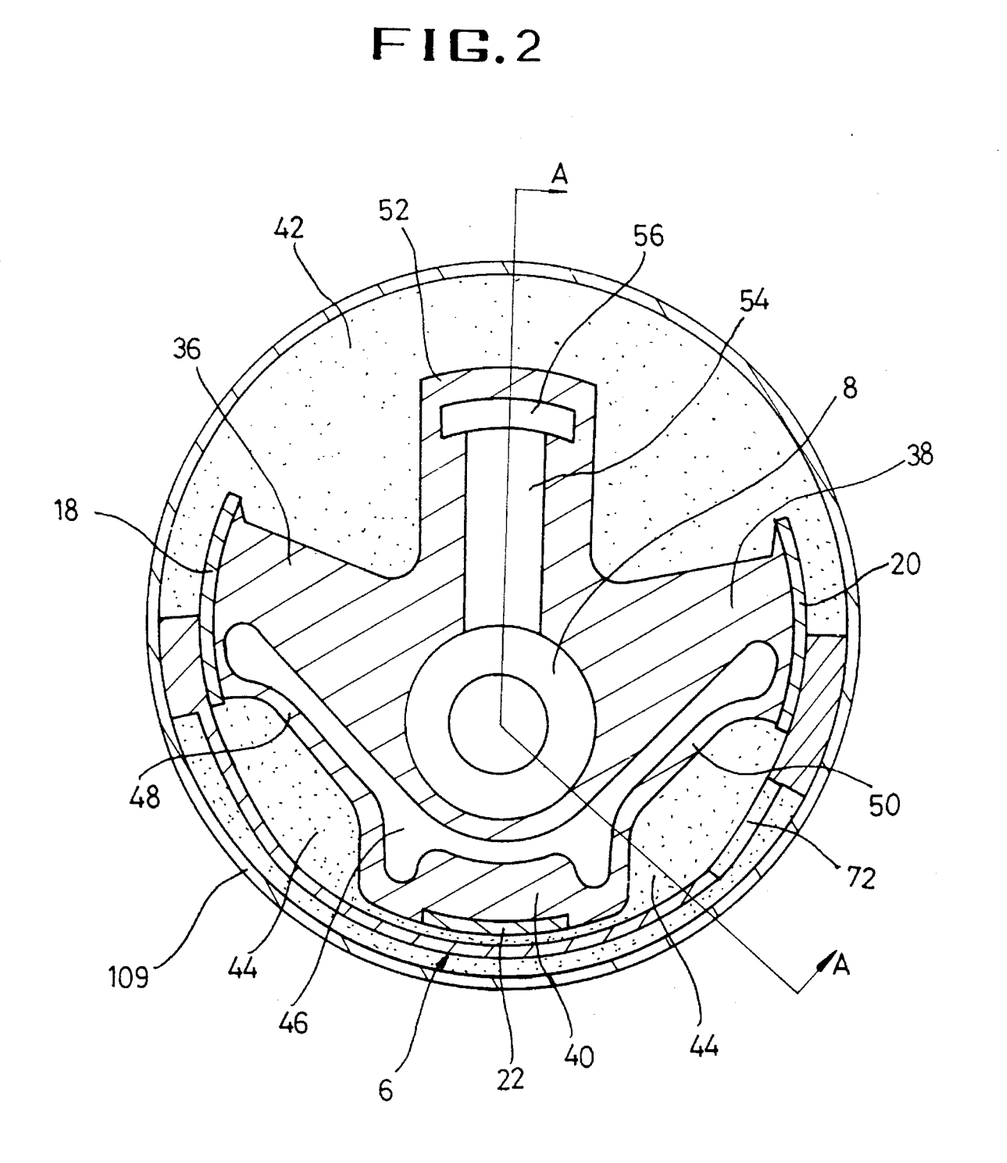
FIG. 2 is a sectional view taken along line B—B in FIG. 1 when the hydro-mount in FIG. 1 is assembled in a body.

The boss 26 is provided with projections 36, 38 and 40 extending in a radial direction from the outer surface thereof and contacting respectively the connecting members 18, 20 and 22. Thus, as shown in FIG. 2, main and sub chambers 42 and 44 are defined by the projections 36 and 38 with the outer pipe 10. An elastic hole 46 is formed through the projections 36, 38 and 40 such that diaphragms 48 and 50 are formed respectively between the projections 36 and 40 and between the projections 38 and 40.

A stopper rubber 52 extends from the boss 26 in an opposite direction of the projection 40 and has a hollow portion into which a stopper 54 of the inner pipe 8 is inserted. A support 56 is formed on top of the stopper 54 extending from the inner pipe 8. The support 56 has an arcuate upper portion having a curvature diameter corresponding to the inner diameter of the outer pipe 10.

The frame member, elastic member and inner pipe 2, 4 and 8 are assembled as one body by a moulding process and is then inserted into the outer pipe 10. Thus, as described above, the main and sub chambers 42 and 44 are defined by the projections 36 and 38 with the outer pipe 10.

The orifice member 6 is disposed around the connecting members 18, 20 and 22 and comprises an orifice frame 58 which is formed with a semicircular tube shape and an orifice rubber member 60 which is attached by vulcanization to an outer surface of the orifice frame 58.

Figure 3:
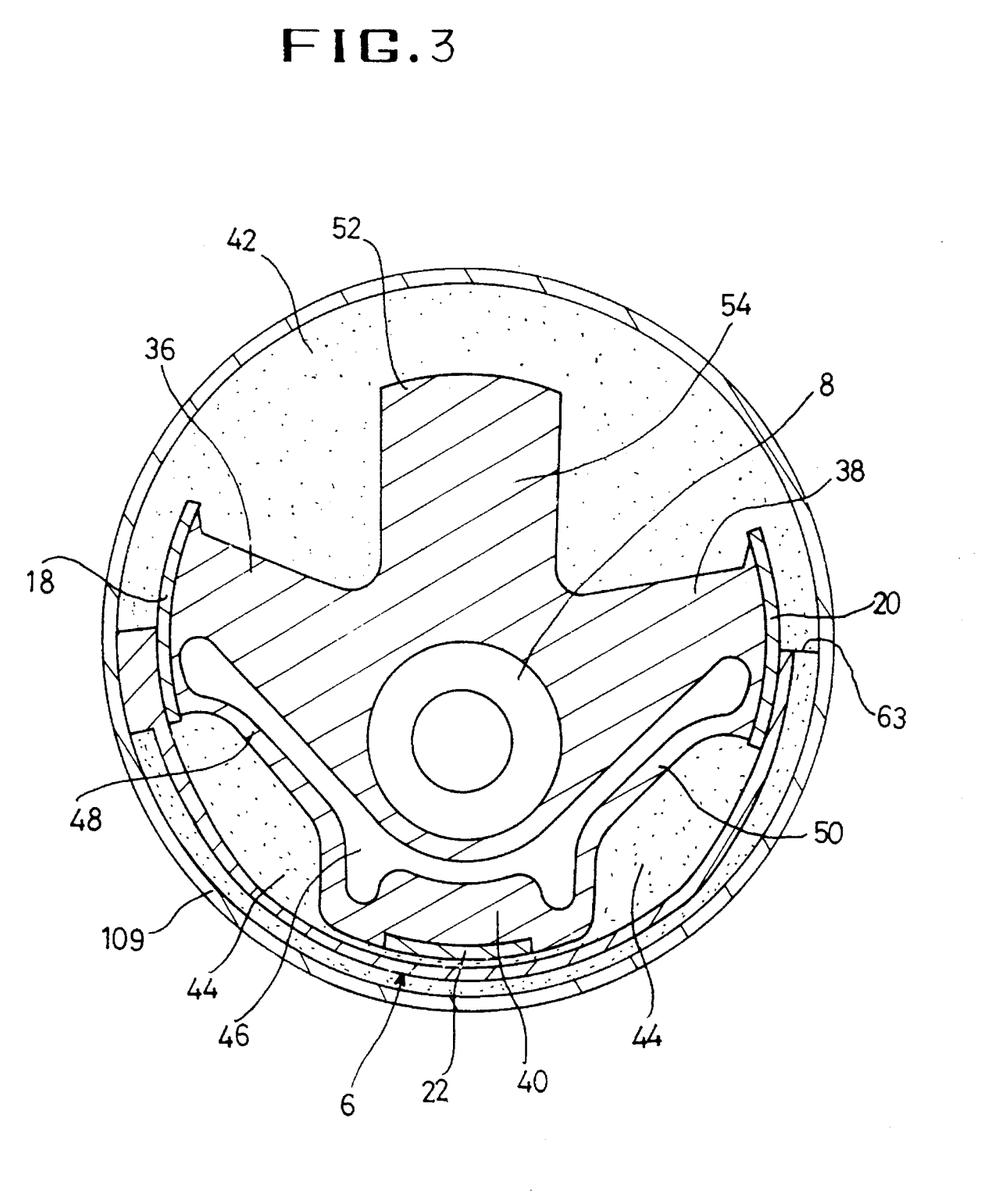
FIG. 3 is a sectional view taken along line C—C in FIG. 1 when the hydro-mount in FIG. 1 is assembled in a body.
Figure 4:
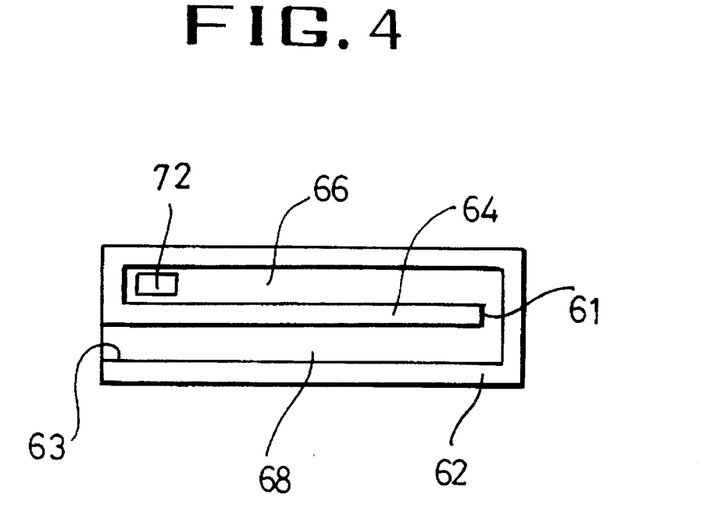
FIG. 4 is a bottom view of an orifice rubber member in accordance with a preferred embodiment of the present invention.
Figure 5:
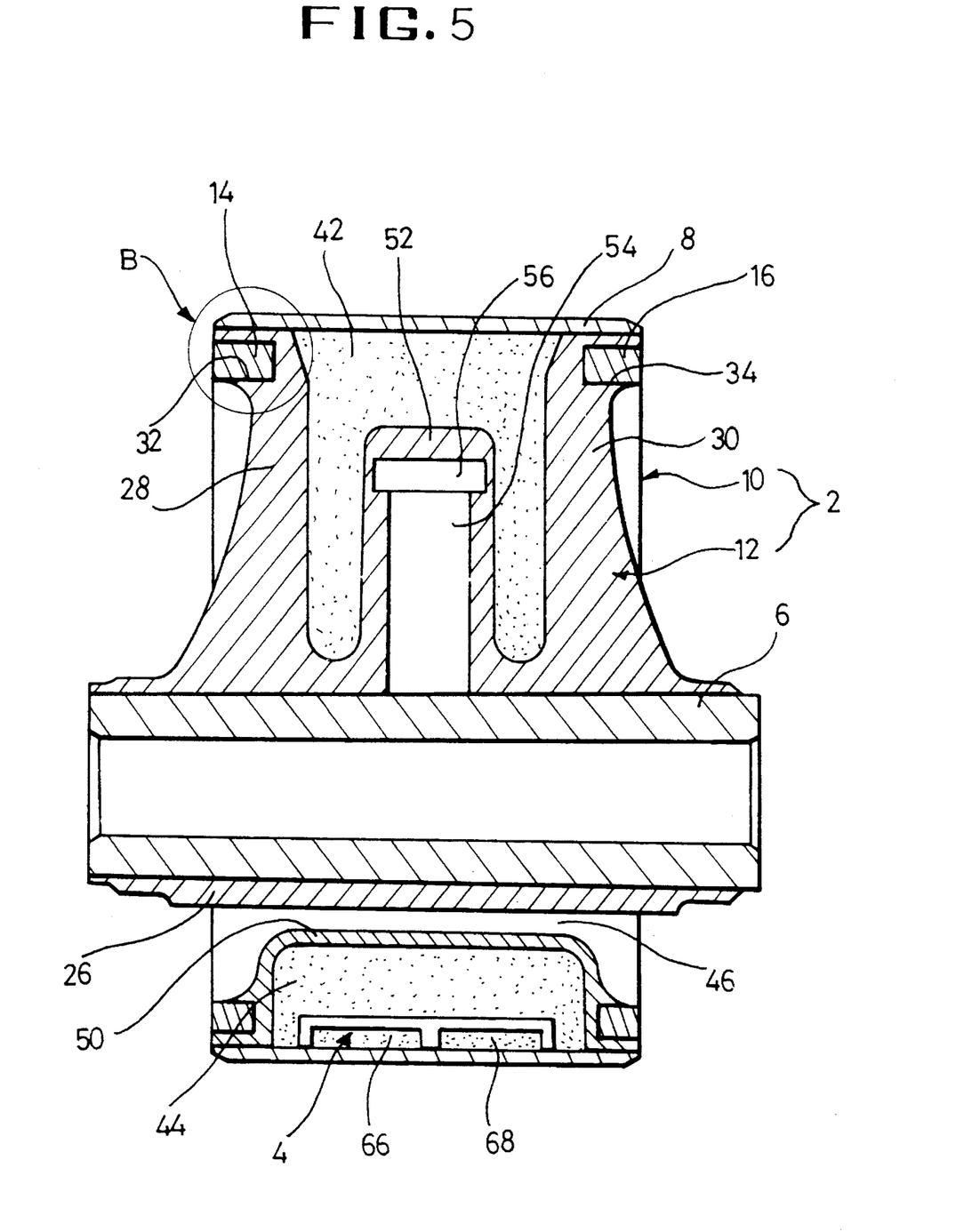
FIG. 5 is a sectional view taken along lines A—A in FIG. 5.
Figure 6:
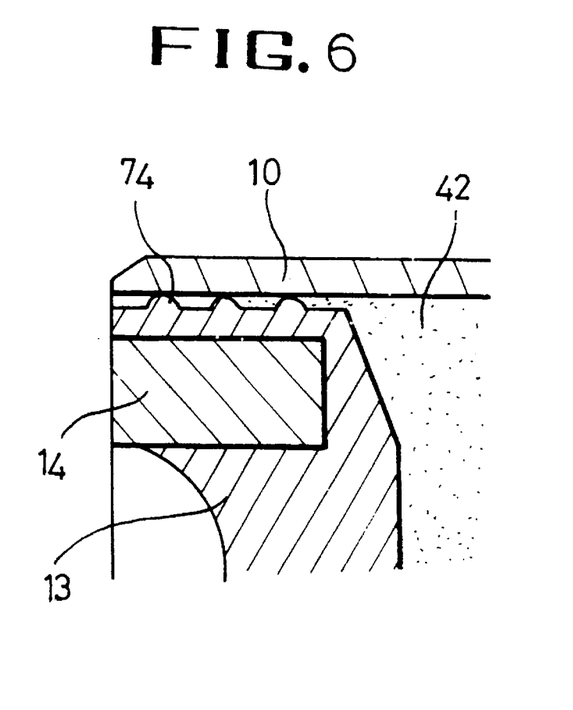
FIG. 6 is an enlarged view of a portion B in FIG. 5.

As shown in FIG. 4, The orifice rubber member 60 is provided with a circumferential jaw 62 formed along a circumferential edge of the outer surface thereof and a middle jaw 64 formed along a middle way of the outer surface, such that fluid passages 66 and 68 can be defined thereby. The fluid passage 66 is provided with an orifice hole 72 formed on its one side. A portion of the middle jaw is cut away at a side, which is opposite to the side where the orifice hole is formed, to form a cutting portion 61 which can communicate the fluid passages 66 and 68 with each other. And a portion of the circumferential jaw 62 is cut away at a side, which is opposite to the side where the cutting portion 61 is defined, to define an opening 63 which can communicate the fluid passage 68 with the main chamber 42 as shown in FIG. 3.

Figure 7:
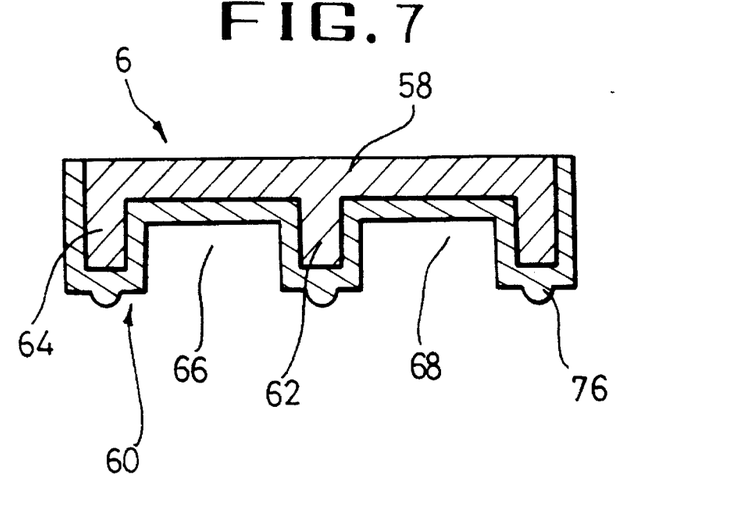
FIG. 7 is a sectional view of an orifice member in accordance with a preferred embodiment of the present invention.

The outer surface of the orifice frame 58 has, as shown in FIG. 7, a configuration which is complemental to a configuration of the inner surface of the orifice rubber member 60. The orifice frame 58 is also provided with an orifice hole 72' corresponding to the orifice hole 72 (see FIG. 1).

Further, as shown in FIG. 7, to maintain a tight seal between the inner surface of the outer pipe 10 and the orifice rubber member 60, a projection 76 protruding from and along the circumferential and middle jaws 62 and 64 is formed.

Accordingly, the main chamber 42 communicates with the sub-chamber 44 through the orifice hole, fluid passages, and opening 72, 66, 68 and 63 of the orifice member 4.

Further, to maintain a tight seal between the elastic member 4 and the outer pipe 10, a plurality of circumferential projections are formed along the outer circumferential surfaces of each side plate 28 and 30 of the elastic member 4 at an even interval, thereby preventing the fluid within the main and sub chambers 42 and 44 from leaking out. The fluid filled within the chambers 42 and 44 is of silicon oil or ethylene glycol.

In the hydraulic mount as described above, when vibration generated by the power plant operation is transmitted to the hydro-mount, relative positions of the outer and inner pipes 10 and 8 are changed to thereby vary the inner pressure of the main chamber 42.

At this point, when the variation value of the inner pressure is to be higher than a certain value, the hydraulic fluid circulates repeatedly between the main and sub chambers 42 and 44 through the orifice hole, fluid passages, and opening 72, 66, 68 and 63 of the orifice member 4 to make pressure differences between them and to thereby absorb the vibration.

At this point, the force for moving the hydraulic fluid within the sub chamber to the main chamber 42 is generated by expansion elastic force and atmospheric pressure which are applied to the diaphragms 48 and 50 which define the sub chamber 44.

In the above described operating precess, in case vibration having slight amplitude and high frequency is transmitted to the hydro-mount, this vibration can be absorbed by self expansion elastic force of the elastic member 4 without fluid flow through the orifice member 4. Therefore, there is no increase of the reduction value.

However, vibration having large amplitude and low frequency which cannot be absorbed by the self elastic force of the elastic member 4 is transmitted to the hydro-mount, the hydraulic fluid flows to increase the reduction value, thereby reducing the movement of the power plant and transition rate of the vibration to the vehicle body.

Further, the dynamic characteristic of the hydro-mount can be, if need, regulated by changing the position of the orifice hole 7 and sectional areas of each fluid passage 66 and 68 of the orifice member 4.

Since the stopper 54 is inserted into the elastic member 4, it is possible to prevent the endurance of the hydro-mount from deteriorating even though the excessive fluid flow occurs at the hydro-mount.

In a practical test where the inventive hydro-mount as described above is used, it has been found that the inventive hydro-mount can obtain an outstanding reducing effects of vibration occurring at the power plant better than that of the conventional rubber mount.

Figure 9:
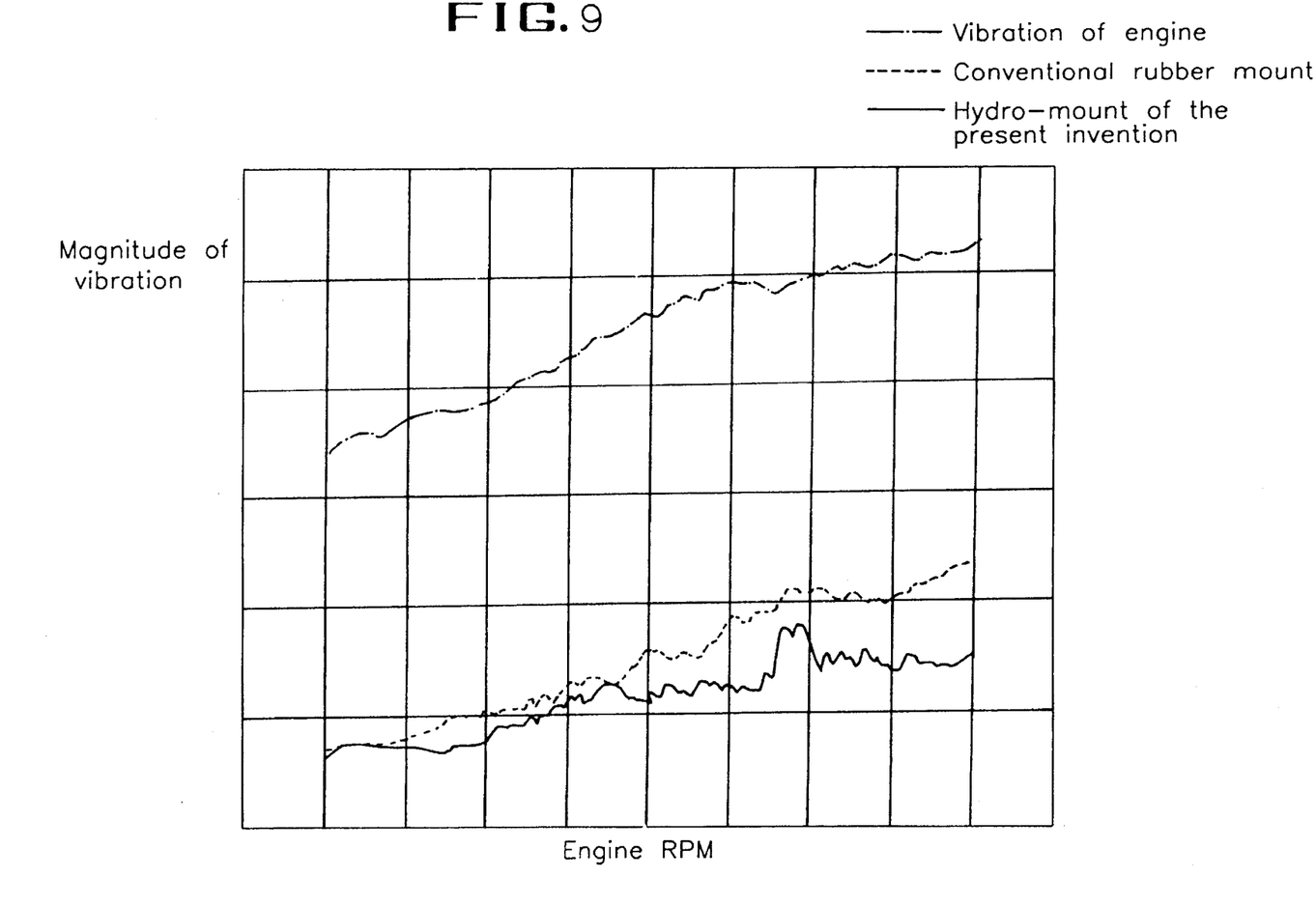
FIG. 9 is a graphical representation comparing an absorbing effect of vibration, occurring at an engine side of a power plant in a vertical direction with respect to a vehicle body of the hydro-mount, of the present invention with that of the conventional mount.
Figure 10:
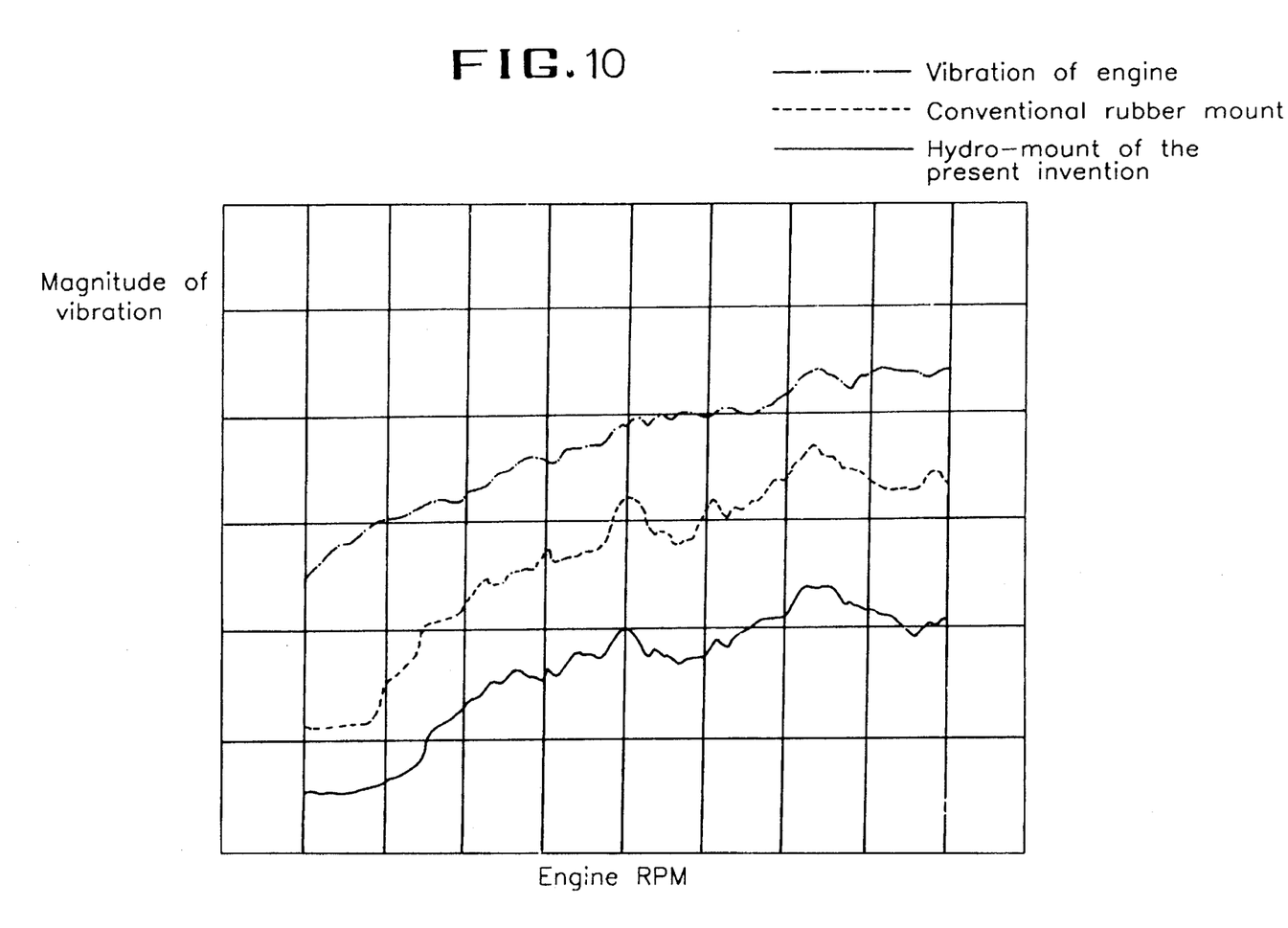
FIG. 10 is a graphical representation comparing an absorbing effect of vibration, occurring at an engine side of a power plant in a longitudinal direction with respect to a vehicle body, of the hydro-mount of the present invention with that of the conventional mount.
Figure 11:
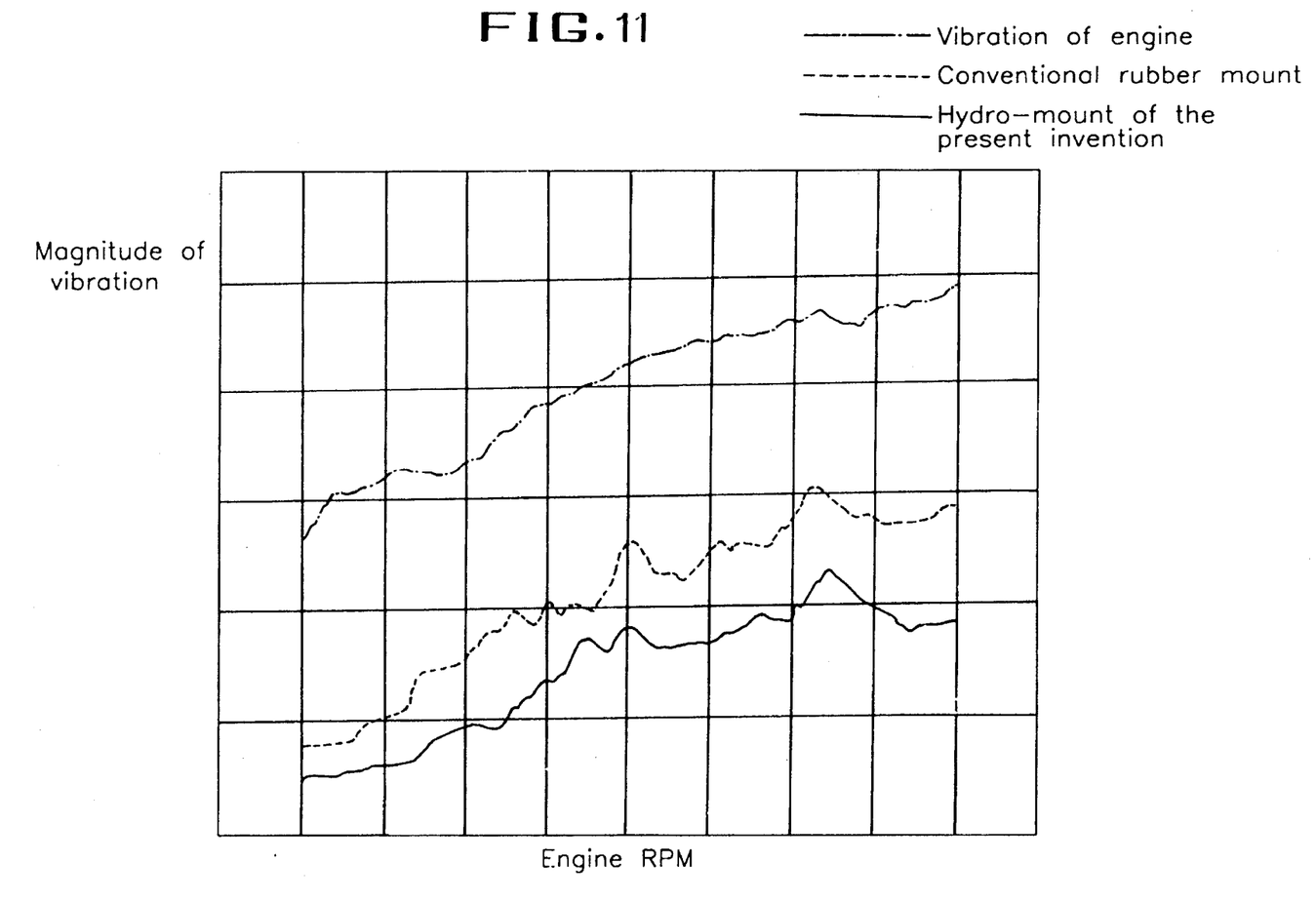
FIG. 11 is a graphical representation comparing an absorbing effect of vibration, occurring at an engine side of a power plant in a lateral direction with respect to a vehicle body, of the hydro-mount of the present invention with that of the conventional mount.

FIGS. 9 to 11 show respectively reducing effects of vibration occurring at an engine side of the power plant in vertical, longitudinal and lateral directions with respect to a vehicle body. That is, when vibration as shown in dot-dash line occurs at the engine, the hydro-mount can outstandingly reduce the vibration to a value as shown in solid line compared with that of the convention mount as shown in dotted line.

Figure 12:
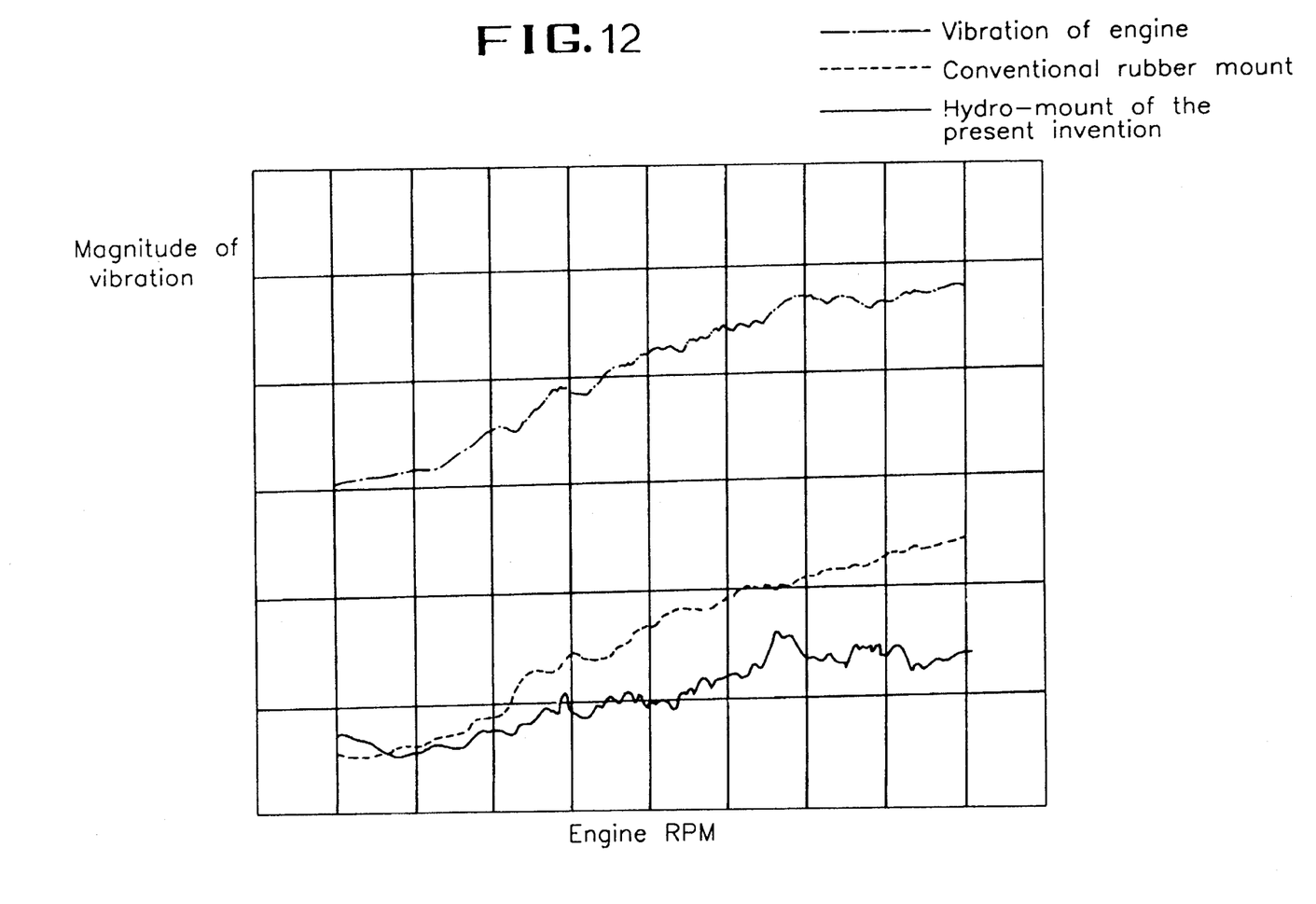
FIG. 12 is a graphical representation comparing an absorbing effect of vibration, occurring at a transmission side of a power plant in a vertical direction with respect to a vehicle body, of the hydro-mount of the present invention with that of the conventional mount.
Figure 13:
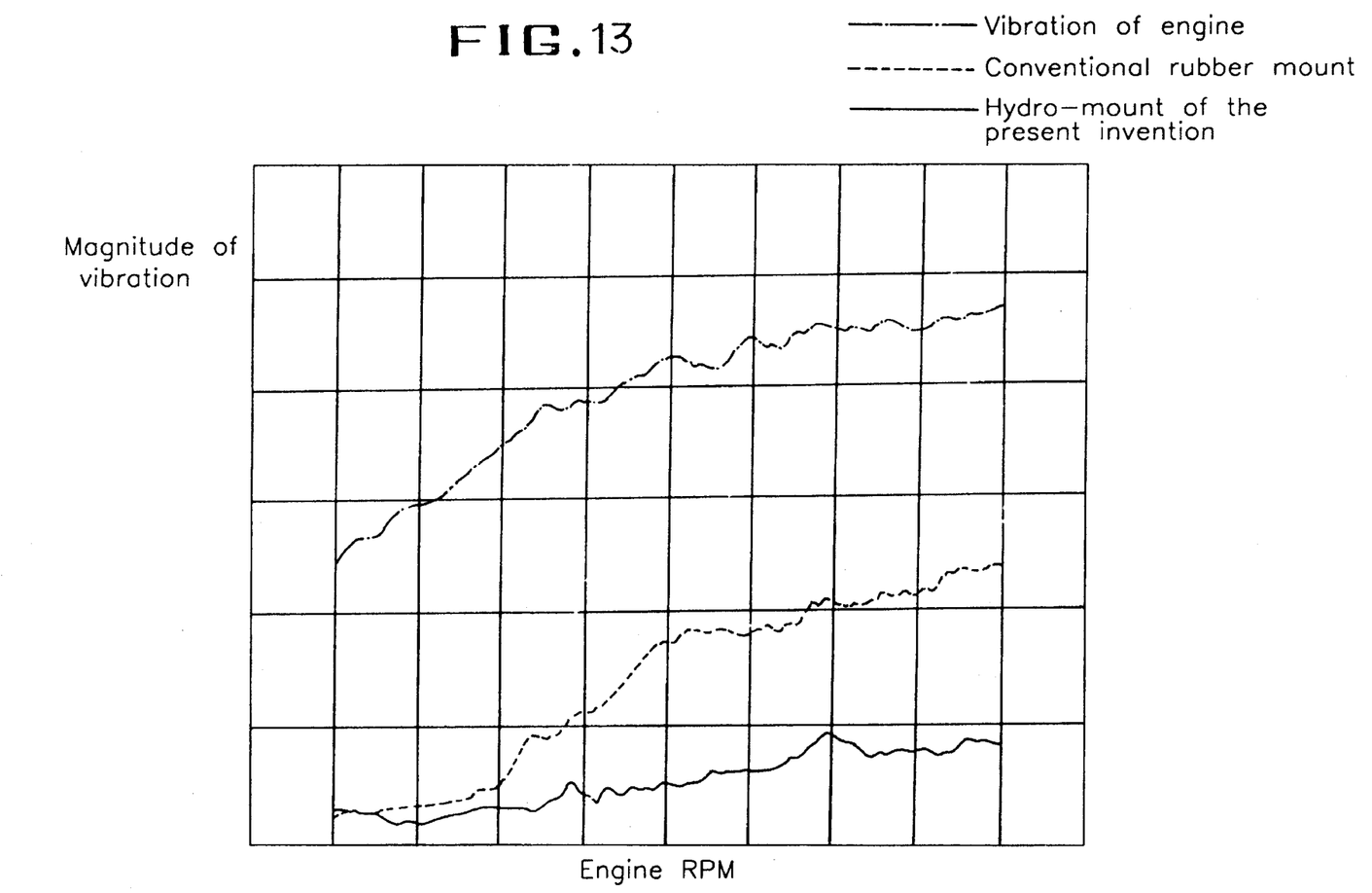
FIG. 13 is a graphical representation comparing an absorbing effect of vibration, occurring at a transmission side of a power plant in a longitudinal direction with respect to a vehicle body, of the hydro-mount of the present invention with that of the conventional mount.
Figure 14:
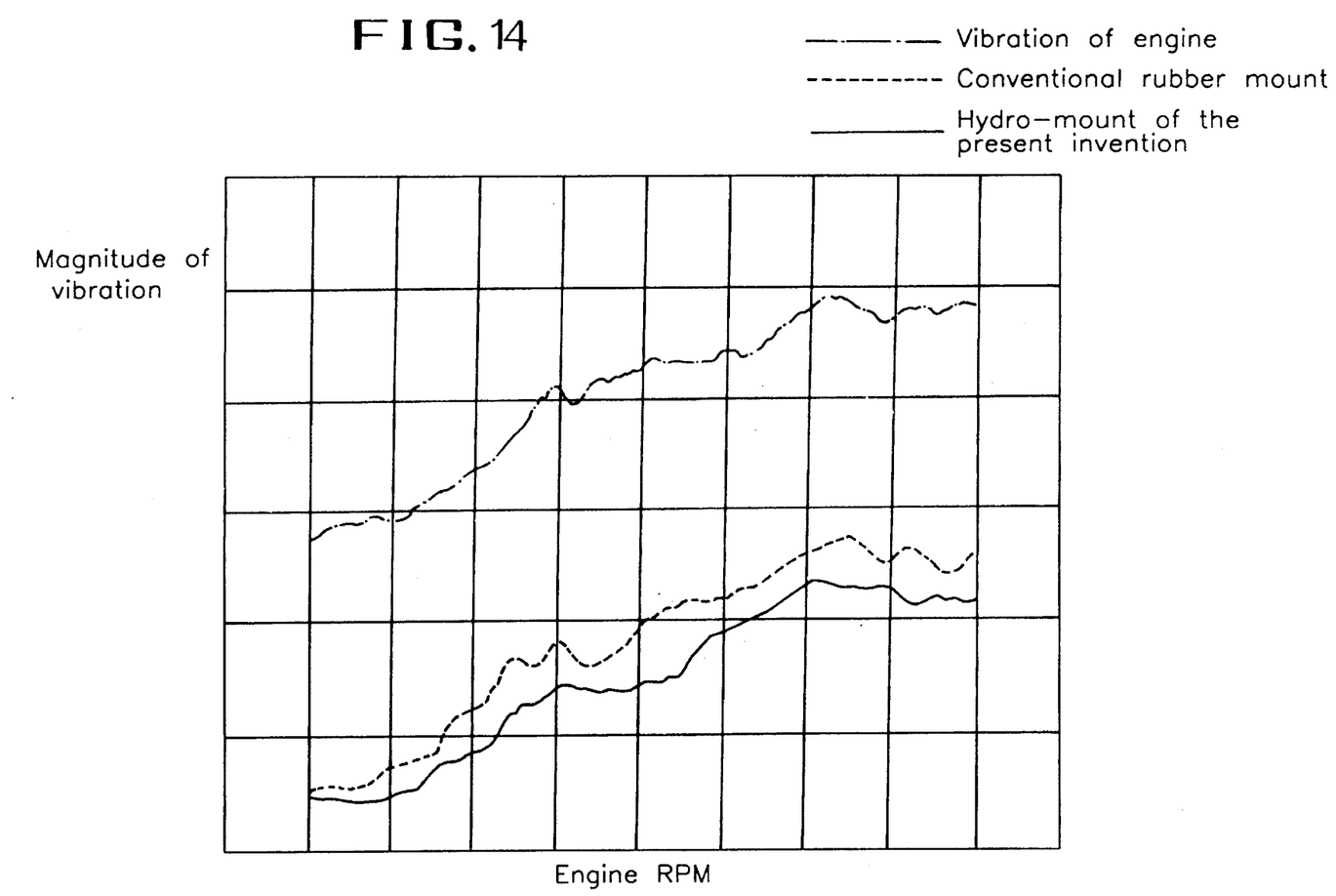
FIG. 14 is a graphical representation comparing an absorbing effect of vibration, occurring at a transmission side of a power plant in a lateral direction with respect to a vehicle body, of the hydro-mount of the present invention with that of the conventional mount.

FIGS. 12 to 14 show respectively reducing effects of vibration occurring at an transmission side of the power plant in vertical, longitudinal and lateral directions with respect to a vehicle body. That is, when vibration as shown in dot-dash line occurs at the transmission, the hydro-mount can outstandingly reduce the vibration to a value as shown in solid line compared with that of the convention mount as shown in dotted line.

Figure 15:
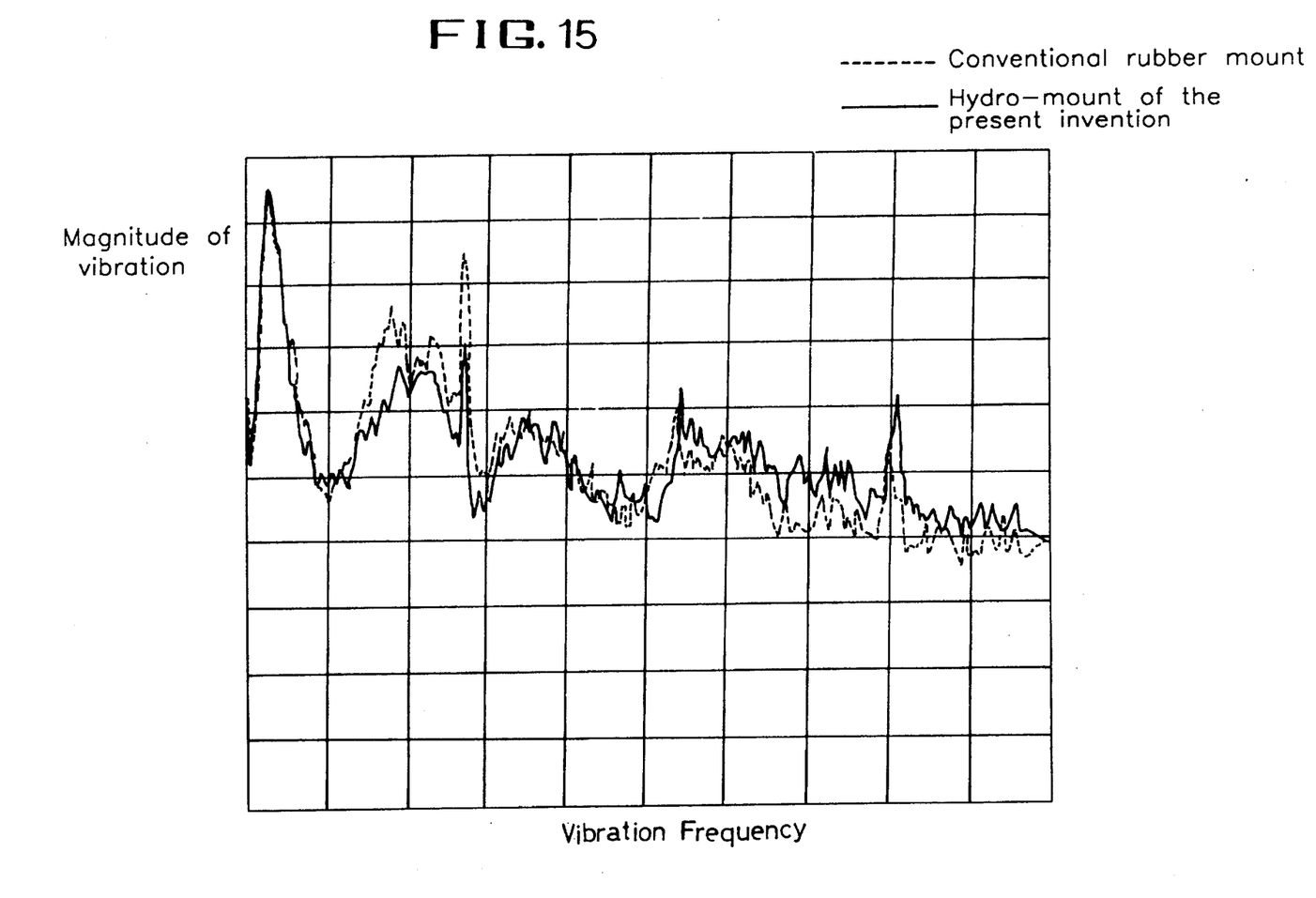
FIG. 15 is a graphical representation comparing an insulation effect of vibration transmitted to the passenger compartment when the vehicle drives at a speed of 100 km/h between the conventional mount and the hydro-mount of the present invention.

Further, as shown in FIG. 15, the hydro-mount of the present invention can outstandingly absorb the vibration transmitted to the passenger compartment when the vehicle drives at a speed of 100 km/h.

Figure 16:
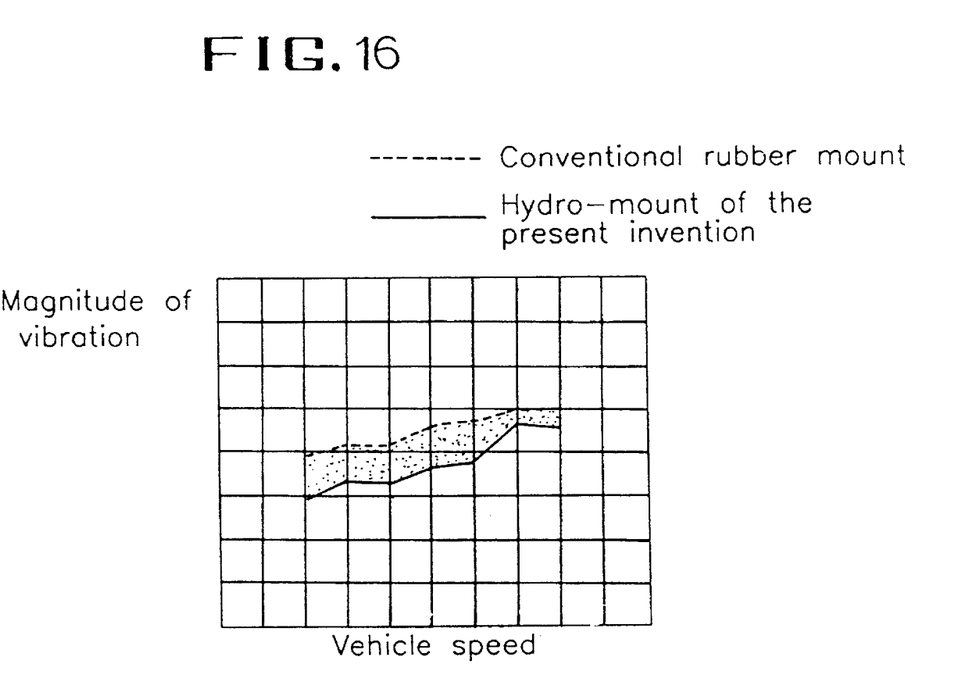
FIG. 16 is a graphical representation comparing an insulation effect of vibration transmitted to the passenger compartment when the power plant vibrates in a vertical direction with respect to the vehicle body between the conventional mount and the hydro-mount of the present invention.

As shown in FIGS. 16, the hydro-mount of the present invention can also outstandingly absorb the vibration transmitted to the passenger compartment when the power plant vibrates in a vertical direction with respect to the vehicle body.

It will be apparent to those skilled in the art that various modifications and variations can be made in the hydromount of the present invention and in construction of this system without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A hydro mount for a power plant having an engine, a clutch, and a transmission all of which are integrally formed with each other, comprising:

an outer pipe having a central axis;

a frame member inserted into the outer pipe and including a pair of ring-shaped rim members arranged along the central axis, and first, second and third connecting members connecting the rim members with each other at a predetermined interval, the first and second rim connecting members being disposed opposite each other on a plane where the central axis is laid and the third connecting member being disposed at 90° with respect to each first and second connecting member;

an elastic member supportably inserted in the frame member and including a boss having a penetrating hole, a pair of circular-shaped side plates attached respectively on opposite ends of the boss, and first, second, and third projections extending in a radial direction from an outer surface of the boss and contacting respectively the first, second and third connecting members of the frame member to define a main chamber and a sub-chamber with the outer pipe and the pair of plates;

orifice means disposed around the connecting members of the frame to communicate the main chamber and the sub-chamber with each other; and an inner pipe inserted and attached by vulcanization to the penetrating hole of the boss of the elastic member.

2. The hydro-mount according to claim 1, wherein the orifice means includes an orifice rubber provided with a circumferential jaw formed along a circumferential edge of an outer surface thereof and a middle jaw formed along a middle way of the outer surface to thereby define first and second fluid passages, the first fluid passage being provided with an orifice hole formed on its one side, a portion of the middle jaw being cut away at a side, which is opposite to the side where the orifice hole is formed, to form a cutting portion which can communicate the first and second fluid passages with each other, and a portion of the circumferential jaw being cut away at a side, which is opposite to the side where the cutting portion is defined, to define an opening which can communicate the second fluid passage with the main chamber.

3. The hydro-mount according to claim 1, wherein the elastic member further includes a stopper rubber extending from the boss in an opposite direction of the third projection and has a hollow portion into which a stopper extending from the inner pipe is inserted.

4. The hydro-mount according to claim 3, wherein a support is formed on top of the stopper, the support having an arcuate upper portion having a curvature diameter corresponding to an inner diameter of the outer pipe.

5. The hydro-mount according to claim 1, wherein an elastic hole is formed through the first, second and third projections such that diaphragms are formed respectively between the first and third projections and between the second and third projections.

6. The hydro-mount according to claim 1, wherein a plurality of circumferential projections formed from and along the outer circumferential surfaces of each side plate of the elastic member at an even interval to prevent fluid within the main and sub chambers from leaking out.

7. The hydro-mount according to claim 2, wherein to maintain a tight seal between the inner surface of the outer pipe and the orifice rubber member, a projection extends from and along the circumferential and middle jaws.

8. The hydro-mount according to claim 2, wherein the boss is eccentrically disposed from the central axis.

* * * * *